United States Patent [19]
Barker et al.

[11] 4,395,626
[45] Jul. 26, 1983

[54] GASOLINE STATION SYSTEM FOR ENABLEMENT OF SELECTED PUMPS BY A CREDIT CARD CONSOLE LOCATED AT THE PUMP ISLAND

[75] Inventors: Thomas H. Barker, South Holland, Ill.; Thomas L. Roach, Dyer, Ind.

[73] Assignee: Atlantic Richfield Company, Philadelphia, Pa.

[21] Appl. No.: 334,630

[22] Filed: Dec. 28, 1981

[51] Int. Cl.³ .............................................. G07F 7/08
[52] U.S. Cl. ................................... 235/381; 235/380; 235/382; 340/825.35
[58] Field of Search .................. 235/380, 381, 382; 340/825.35

[56] References Cited
U.S. PATENT DOCUMENTS
4,199,100  4/1980  Wostl et al. .................. 235/381

*Primary Examiner*—Harold I. Pitts
*Attorney, Agent, or Firm*—John B. Goodman

[57] ABSTRACT

A system for use in a gasoline station for automatic enablement of fuel dispensing means from the fuel island by a customer credit card comprising credit card reader means, customer operable keyboard means, display means, output channel means, and first processor control means, together with attendant control means for use by the attendant of the gas station. The attendant control means is manually operable by the attendant for enabling a selected fuel dispensing means, thereby providing an indication to the attendant of the value of dispensed fuel made by the customer.

Card operated fuel dispensing means. Dispensing generates coded signals.

7 Claims, 7 Drawing Figures

GASOLINE STATION SYSTEM FOR ENABLEMENT OF SELECTED PUMPS BY A CREDIT CARD CONSOLE LOCATED AT THE PUMP ISLAND

BACKGROUND OF THE INVENTION

The present invention relates to a customer controlled terminal for enablement of a selected fuel dispenser, and more particularly relates to a customer console which communicates with an attendant-controlled terminal located within the sales office of the gasoline station.

Heretofore, equipment has been provided in service stations which permit the remote enablement of gasoline dispensers by an attendant-controlled terminal. The terminal is located in the sales office of the service station remote from the islands containing pump dispensers. Such a terminal prevents theft of gasoline by allowing only the attendant to enable fuel dispensing pumps.

A fully automated vending apparatus for the dispensement of fuel, is described in U.S. Pat. No. 3,786,421 issued to W. Wostl on Jan. 15, 1974. The Wostl device provides a step forward in the art, eliminating the service station attendant altogether by permitting self-vending of the fuel and self-payment by the customer. The Wostl device, however, is not capable of handling the sales of goods which cannot be automatically dispensed and, therefore, does not create a transactional receipt for the purchased goods.

Wostl and others thereafter invented other apparatus in order to provide an automated credit card transaction in a vehicle service station which not only speeds up sale transaction but permits the use of an attendant on duty in order to reduce the likelihood of error and fraud. U.S. Pat. No. 4,199,100, Wostl et al., discloses a terminal apparatus which monitors a plurality of fuel dispensers for selectively retrieving fuel sales information to be automatically combined with miscellaneous sales information in the form of a printed receipt by simple command from the attendant. This second generation Wostl device resulted in a step forward in the art providing service station attendant interplay with automated service station functions.

Where a service station includes a terminal apparatus at a central location which is operated by an attendant, the customer parks his car at the pump islands and pumps gas into his vehicle from a normally enabled pump. The customer then walks to the central location for payment by credit card or cash. By permitting the pumps to remain normally enabled at the many islands of the service station, a single attendant is unable to prevent "drive-offs" in which a car pulls to a remote pump, the tank is fueled by the driver and the driver merely drives away without paying.

In order to prevent such drive-offs, some service stations require the customer to walk in to the central location and make pre-payment for gasoline, either by cash or credit card before the attendant will enable the pump. After making prepayment, the customer must then walk back to the pump island and dispense gasoline. After the dispensing is completed, the customer must then return to the central location to complete the sales transaction by picking up his cash receipt or signing the credit card receipt. It would therefore be highly desirable to provide apparatus which still permits use of a centrally located terminal apparatus and at the same time eliminates the necessity for the customer to make two trips to the centralized location in order to prevent drive-offs.

SUMMARY OF THE INVENTION

It is therefore an object of this invention to automate credit card transactions in a vehicle service station in order to speed up sales transaction and reduce the likelihood of gasoline theft by drive-offs.

A system according to the present invention includes a centrally located terminal apparatus which monitors at least one, and preferably, a plurality of fuel dispensers for selective retrieval of fuel sales information. The central terminal apparatus communicates with the attendant on duty permitting the attendant to selectively enable any one of the island pumps. A remote customer-controlled console located at a gasoline dispensing island communicates with the central terminal in order to permit a customer to provide "collateral" by way of credit card to instruct enablement of the selected pump by the customer at a location remote from the central terminal apparatus. A remote customer-controlled console includes a credit card reader which obtains credit card information in order to verify the credit status of the card the customer is using for collateral. A keyboard and display device are included on the customer console for permitting the customer to select an individual pump for enablement.

DESCRIPTION OF THE PREFERRED EMBODIMENT

Figure 1:
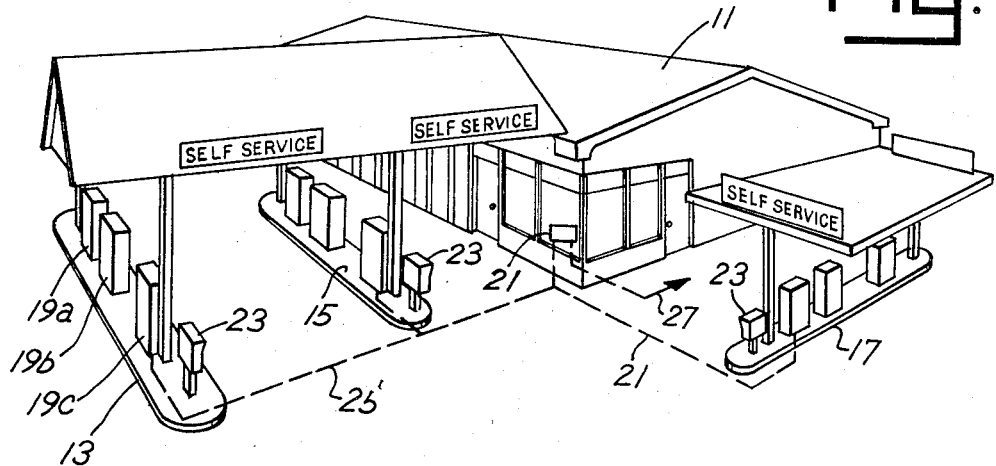
FIG. 1 is a perspective view of a gasoline service station incorporating the system of the present invention.

Referring to FIG. 1, a gasoline station 11 includes a plurality of gasoline dispensing islands 13, 15, 17. Each island is shown having three separate gasoline dispensers 19a, 19b, 19c, each of which may have one or two fuel outlets for dispensing separate types of fuels, as for example, regular, high octane, and no-lead gasoline.

Apparatus of the present invention includes an attendant-controlled console or terminal 21, positioned within the sales office of gasoline station 11, and a customer-controlled console 23 disposed at each dispensing island 13, 15, 17. An underground cable 25 provides communication between console 21 and each of the nine pumps and each of the customer-controlled consoles 23. A second cable 27 connects console 21 to a data bank (not shown) for transmission and receipt of credit card information. As will suggest itself, cable 25 may be positioned overhead instead of underground.

Figure 2:
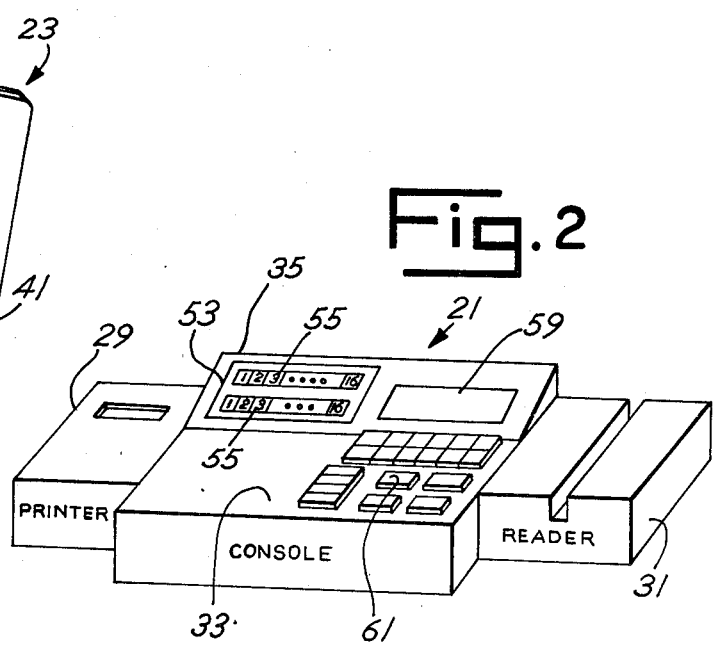
FIG. 2 is a perspective view of an attendant-controlled terminal of the system of FIG. 1.

Console 21 is shown in more detail in FIG. 2 as including a receipt printer 29, a credit card reader 31, a keyboard 33 and a visual display and pump control keyboard area 35. Console 21 is controlled by the attendant on duty who may take cash or credit cards for payment of gasoline dispensed from the pumps. Printer 29 and display area 35 may be utilized to provide proper sales information as to both gasoline and miscellaneous items purchased by the customer. The particular operation of console 21 is discussed in greater detail in U.S. Pat. No. 4,199,100, Wostl et al., which is assigned to the assignee of the present invention. U.S. Pat. No. 4,199,100 is incorporated herein by reference.

Figure 3:
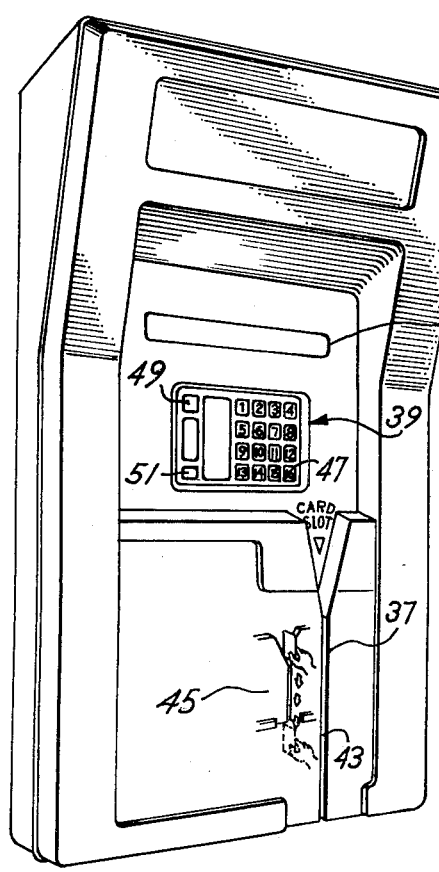
FIG. 3 is a perspective view of a customer-controlled console of the system of FIG. 1.

Customer-controlled console 23 is shown in more detail in FIG. 3 as including a credit card reader 37, a keyboard 39 and a visual display device 41. Console 23 is controlled by the customer in order to enable a selected one of dispensing pumps 19. The customer pulls or "swipes" his credit card through credit card reader 37 in order to provide "collateral" for automatically enabling a fuel dispensing pump. The particular pump which the customer desires to be enabled is keyed into keyboard 39. The display device 41 provides various communication instructions to the customer in order to aid him to properly enable a selected fuel pump.

Each of the plurality of island customer-controlled consoles 23 communicate with the attendant console 21 in order to provide pump enablement. Console 21 serves to control the actual pump enablement and credit authorization as well as instructing customers at each island during the enablement process.

The customer is guided through the use of the island console 23 by a series of prompting messages displayed on display device 41. When in use, the customer will "swipe" his credit card through reader 37 and the card numbers will be conveyed to attandant console 21. There the credit card numbers are transmitted in a normal fashion (as though the card numbers were read from card reader 31) to a data bank at a credit verification facility. If credit approval is given, the customer will be instructed on display device 41 to select a dispenser hose number via keyboard 39. His selection will be indicated to the attendant within the station by indication in the display area 35 of attendant console 21. The attendant then will manually authorize the pump via the console 21. As will suggest itself, the attendant could be bypassed where console 21 is constructed to automatically enable the appropriate hose when properly selected by the customer. However, the interplay of the attendant in the enablement process keeps the attendant apprised of enabled pumps for his subsequent completion of the sale.

Once the selected hose is enabled, the customer may then begin dispensing fuel. Upon the completion of fueling, the customer will proceed to the attendant at the attendant console to complete the sale. The sale will be completed by signature to the credit card receipt or by cash payment by the customer instead of using the credit card which served as collateral to enable the pump.

Multiple customers may use a single island console 23 as long as they do not attempt to dispense from the same hose. Likewise, customers at other islands may be using additional island consoles 23 concurrently with the operation of the console 23 at the first island.

The communication link between customer console 23 and attendant console 21 is serial in nature, including a transmit cable and a receipt cable. This pair of cables may be sheathed in one overall jacket to form a communication cable between the customer consoles and the attendant-controlled console. In order to isolate the communication link from transmitted and induced noise, transformer couplings, opto-isolator couplings or a fiber-optic link may be utilized for isolation, as will suggest itself.

When in operation and idling, display 41 at the customer console will display "INSERT CARD". A flashing arrow pointing to the card reader may also be included in the message. Once the customer has successfully "swiped" his card through the credit card reader, the display will display "CHECKING CREDIT" as the card number is sent to attendant console 21 for credit authorization. Where credit is denied, a message will appear on the customer console display, as for example, "INVALID CARD", "DENIED", or "CARD EXPIRED". Cards which have been stolen (or the like) and require attendant intervention will cause a "SEE ATTENDANT" to be displayed on the display device. Where a card cannot be read after three attempts, the display device will display "SEE ATTENDANT".

When creidt authorization has been obtained by attendant console 21, the display on the customer console will say "CREDIT OK" and "SELECT PUMP". The "SELECT PUMP" message may also include a flashing arrow pointing to keyboard 39. The customer uses keyboard 39 to select a pump number. This selection is shown on the display, followed by "UNAVAILABLE" or "PUMP IN USE" for non-programmed or in-use pumps. For an available pump, the display will flash "FUEL AT PUMP NO. X" and attendant console 21 will signal the attendant that pump enablement is requested. The attendant then enables the customer selected pump for dispensing fuel.

When a pump has been properly selected and enabled, and the handle for that pump is actuated, the attendant console receives an indication of handle actuation and will reset (return to idle) customer console 23; the display at the customer console will return to "INSERT CARD" so that the next customer may begin his transaction.

Failure to actuate the pump handle of the selected pump within a predetermined number of seconds, for example, thirty seconds after the "FUEL AT PUMP NO. X" message first appears, will cause the entire transaction to be cancelled. The pump will be deauthorized, the credit card number will be erased from console 21, and the island console will return to the "INSERT CARD" message.

Referring in more detail to FIG. 3, credit card reader 37 includes a card receiving slot 43 adapted to receive the customer's credit card in a sliding fashion, as the operator pulls the card downwardly through slot 43. Visual indicia 45 is inscribed adjacent slot 43 for explaining to the customer how to perform the displayed instruction "INSERT CARD" appearing on display 41. As shown, indicia 45 is pictorial in nature and may be positioned on either side of slot 43; however, additional instructions in words may be positioned with the pictorial indicia or on the other side of slot 43, as will suggest itself.

A reading head (not shown) positioned along the insides of guide slot 43 generates a signal having the information carried by the card as the card is pulled quickly through the slot. Card reader 37 retrieves the information from the card for commanding automatic investigation by attendant console 21 of the credit status of the particular credit card read.

Keyboard 39 includes a numeric key pad 47 for entering a selected pump number. As shown, pad 47 includes keys bearing numbers 1 through 16. After a numeric key is pressed, the attendant console signals the attendant to enable the particular pump associated with the key actuated by the customer on key pad 47. Other keys may be included on keyboard 39 if desired. For example, a "HELP" key 49 and a "CLEAR ENTRY" key 51 are shown in FIG. 3.

Attendant console 21 (FIG. 2) includes a dispenser control key pad 53 shown as having two rows of sixteen fuel pump selection buttons 55. Each button 55 is associated with one gasoline pump and may be lighted separately for signalling the attendant. Each button 55 is also actuable separately as a switch to permit instructional commands from the attendant. Since a button 55 performs the dual function of a keyboard switch and a display device, the button may be considered as part of keyboard 33 and as part of display area 35.

The top row of buttons 55 are actuable for enabling a particular pump; the bottom row of buttons 55 are actuable for collecting data of a particular pump to be viewed on display 59. When a customer selects a particular pump for enablement via an island terminal, the associated pump number button 55 on the attendant console flashes; this signals the attendant to actuate the flashing button in order to enable the requested pump. An audible beeping may also be generated in conjunction with the flashing of button 55, as will suggest itself.

The attendant's actuation of a flashing button 55 of the top row of keypad 53, causes the flashing light of the button to become a steady "ON" light for displaying to the attendant which pumps are in use. After the customer has completed dispensing fuel and actuates the pump handle, the lighted button 55 is extinguished and its corresponding button 55 positioned below on the lower row of keypad 53 lights steadily; this signals the attendant that payment is to be taken for gasoline dispensed from that pump. Actuation of the steadily lighted button 55 on the lower row of keypad 53 changes the steady "ON" light of the button to a flashing light and causes display of the gasoline value onto display 59. A receipt may then be printed from printer 29 by actuation of an enter/printing key (generally referred to by reference numeral 61) which causes console 21 to make ready for printing a receipt for the sale of gasoline from the pump associated with the button 55 selected, as described in Wostl et al, U.S. Pat. No. 4,199,100. The printing of a receipt may serve to extinguish the associated lighted button of the lower row of keypad 53. The pump is reset by subsequent actuation of button 55 on the upper row of keypad 53, when re-enabling the pump for the next customer.

Printer 29 may take the form of a conventional dot matrix printer of the alpha-numeric variety. Ordinarily, printer 29 prints individual customer receipts. Where payment is made by way of credit card, printer 29 is operable to print on preformed, pre-printed credit invoices having a plurality of sheets for formulating at least a customer copy and a charge copy. The credit invoice is printed to contain the particular credit card number of the customer and the total sale amount. Further printing may include other particulars as will suggest itself.

Figure 4:
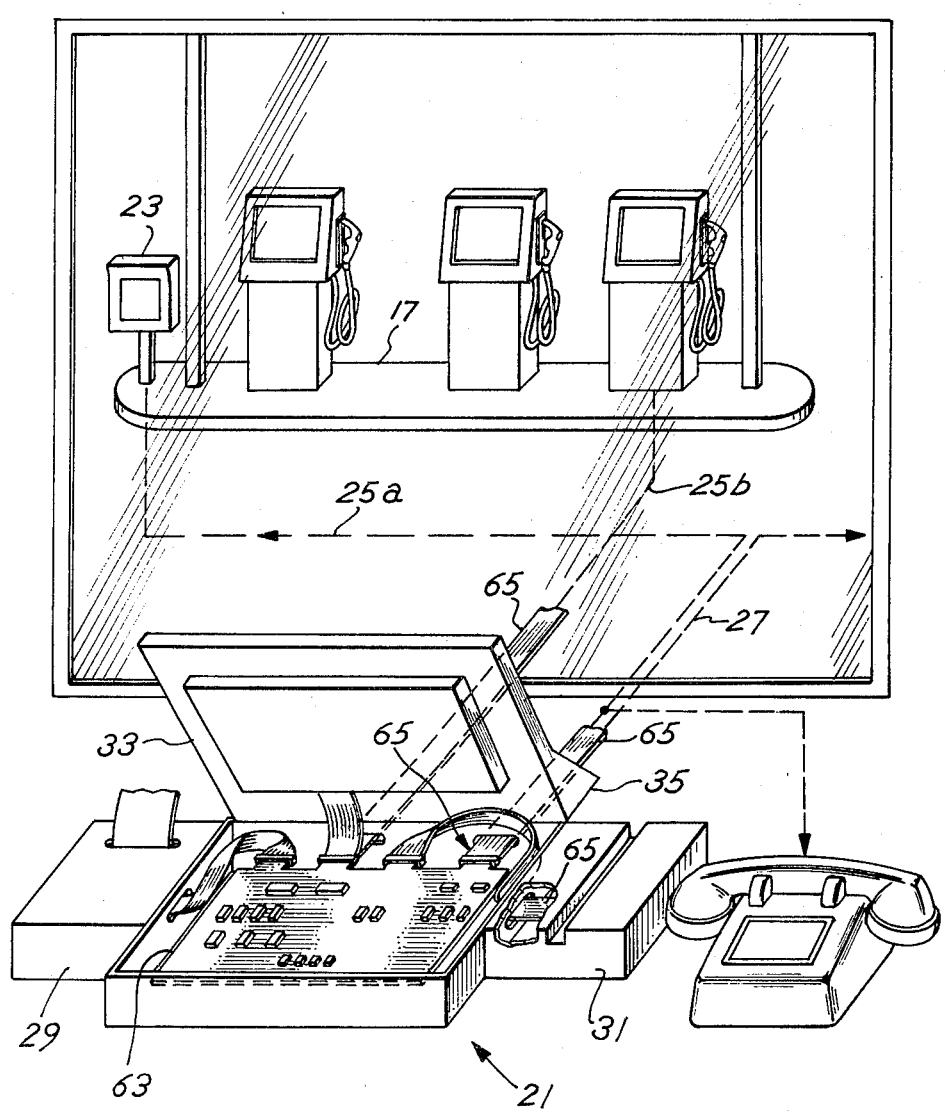
FIG. 4 illustrates a conventional microcomputer forming the process and control system of the terminal of FIG. 2.

Referring to FIG. 4, a conventional microcomputer 63 controls the overall system processing and management of console 21. The microcomputer performs a number of tasks which may be summarized as follows:

(1) data is retrieved from the dispensing pumps in the form of a measure of the value amount of the gasoline dispensed and is manipulated by microcomputer 63 to enable printing of gasoline sale information by printer 29;

(2) credit card data read from the customer's credit card, either from card reader 31 or card reader 37, is manipulated to provide output commands along cable 27 for enabling transmission of the credit card information to a data bank for establishing credit authorization;

(3) data is retrieved from and transmitted to customer controlled console 23 in order to provide instructions to a customer during customer enablement of a selected one of the fuel dispensing pumps.

One suitable microcomputer 63 may include a conventional Z-80 microprocessor. As with U.S. Pat. No. 4,199,100, reference here also is made to publications of Mostek Corporation, Carrollton, Tex.: Mostek's MK 3880 Central Processing Unit Technical Manual, February, 1977 and Mostek's MK 3881 Parallel I/O Controller Technical Manual, November, 1976. Also a serial communications device, MK 3887, may be used in a serial input/output interface. More particularly, when using more than one island terminal, IBM SDLC protocol may be used to permit the attendant terminal to communicate with a select one of the island terminals. As understood, the SDLC coding includes an address code to tell which island terminal is to be talked with by the attendant terminal 21. A conventional Zilog Z80 SIO chip may be used to permit the SDLC protocol.

As shown in FIG. 4, microcomputer 63 treats printer 29, card reader 31, keyboard 33, display area 35, fuel dispensing pumps 19a–c and customer consoles 23 as peripheral devices which are interconnected by means of bus cables 65. The microcomputer is also connected to cable 27 for communication with the data bank.

Microcomputer 63 is interconnected to the dispensing islands via cable 25b for monitoring the sale of gasoline dispensed from each pump and for monitoring the actuation of the pump handle when the customer begins to dispense gas. Also, the dispensing islands receive commands from microcomputer 63 for enabling and resetting selected pumps.

The final totals for each pump are transmitted to microcomputer 63 at the completion of fuel dispensing when commanded by the attendant's actuation of the dispenser control key pad 53. The sales data from the pump is accumulated and the associated pump is made available for selection by another customer. The attendant actuates key pad 53 in order to provide the appropriate gas sales information of a selected pump for printing by printer 29 onto a receipt for the customer. This is described in detail in U.S. Pat. No. 4,199,100.

The pump sales data may be encoded in a number of ways, preferably, the value amount rather than the gallonage is encoded in the pump data. The gallonage may be computable separately by the microcomputer from a known unit price per gallon.

As illustrated in the above-cited Wostl U.S. Pat. No. 3,786,421 (see FIGS. 9–12), fuel pump controls are located on the outside of the pump for actuation by the customer. After a customer completes dispensing a desired quantity of fuel, a handle located on the side of the pump is rotated by the customer to stop the gasoline tally permitting the pump to be replaced in its holder. The rotation of the pump handle can be utilized to place the pump's final sales data in a ready state for retrieval by the microcomputer when desired. The pump may automatically lock at this time until reset by the microcomputer. Further, when the pump handle is initially rotated by the customer to begin gasoline after pump enablement by the attendant, a control signal is retrieved by microcomputer 63 for returning to idle the island console 23 which requested the associated pump to be enabled. As will suggest itself, if the pump handle is rotated without previous attendant enablement, the control signal may serve to cause actuation of a beeping signal to alert the attendant accordingly.

Figure 5:
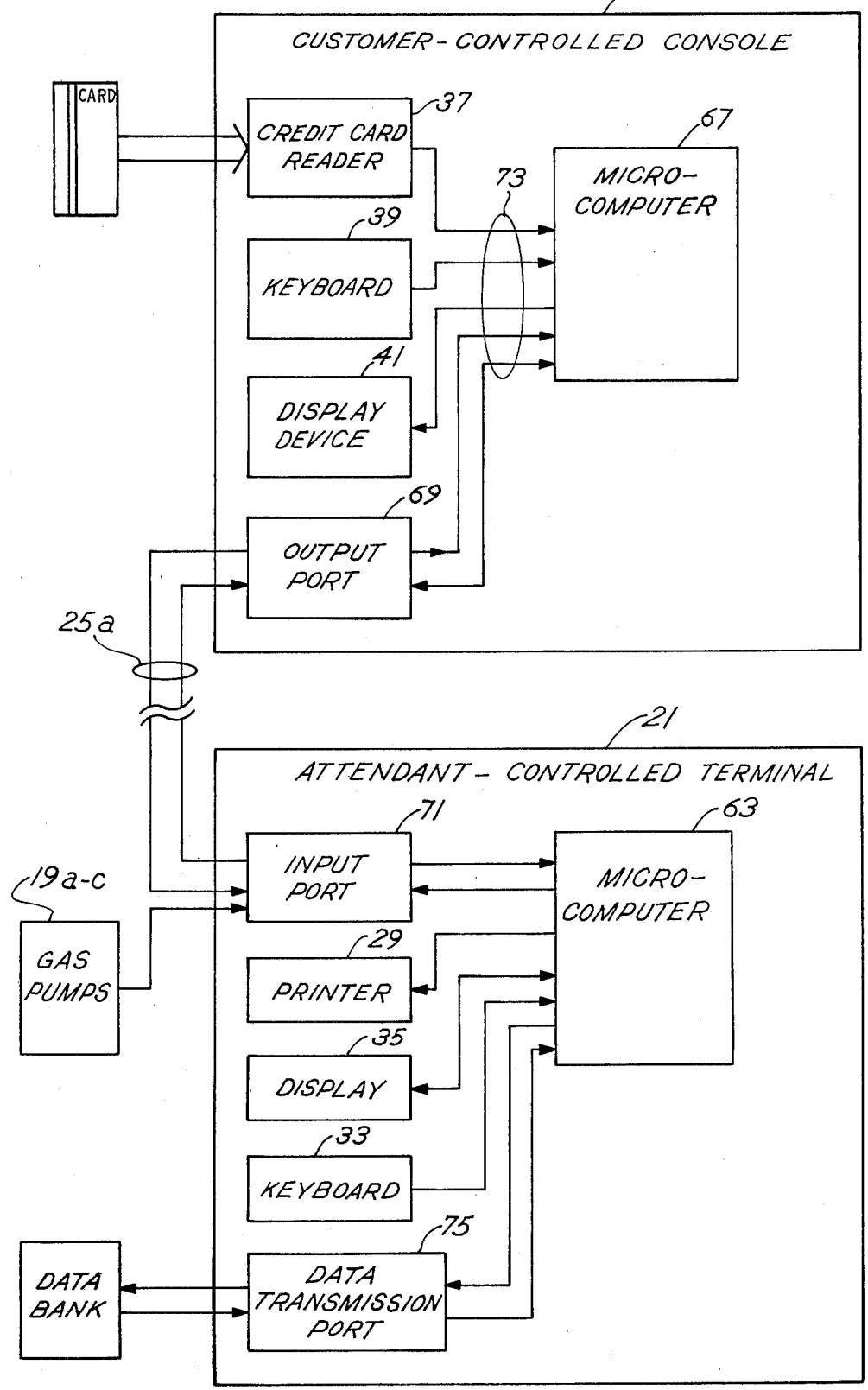
FIG. 5 is a block diagram illustration of the customer-controlled console of FIG. 3 and the attendant-controlled terminal of FIG. 2.

Referring to FIG. 5, a conventional microcomputer 67 controls the processing and management of customer-controlled console 23. Microcomputer 67 may similarly be constructed from a Z80 Microprocessor. The microcomputer performs a number of tasks which may be summarized as follows:

(1) data is retrieved from card reader 37 of the information read from the customer's credit card and is manipulated to provide output commands via an output channel or port 69; output port 69 is connected along cable 25a to an input port 71 of microcomputer 63 of the attendant console;

(2) data is retrieved from keyboard 39 of the particular pump number selected by the customer and is manipulated to provide output commands along cable 25a via output port 69 to attendant console 21;

(3) data is received from the attendant console via outport 69 of particular instructional commands for causing display of information to the customer and is manipulated to provide output commands to display device 41 for displaying visual instructions to the customer operating console 23.

As shown in FIG. 5, microcomputer 67 treats credit card reader 37, keyboard 39, display device 41 and output port 69 as peripheral devices which are interconnected by means of a bus or cables 73. Microcomputers 63, 67 include a conventional 8-bit parallel bus microprocessor having an accumulator, a plurality of registers and an instruction register and CPU control for interpretation and execution of micro-level assembly language instructions. Microcomputer 63 manages the acquisition of dispensing sales data from gasoline pumps and other sales information data entered through keyboard 33, processes the data and prints the sales information in receipt form via printer 29. The system is managed under the control of keyboard 33 permitting the attendant to initiate particular operations to be performed by microcomputer 63. These functions are described in connection with flow diagrams in U.S. Pat. No. 4,199,100.

Output port 69 and input port 71 are shown in FIG. 5 as diagrammatic blocks connected by a communication link represented by cable 25a. The output port and input port blocks may be comprised of conventional circuitry depending on whether parallel or serial communication between console 23 and terminal 21 are desired. Where there is only one island console 23 and parallel communication is desired, the ports 69, 71 may comprise buffer latches, as will suggest itself. Conceivably ports 69, 71 may merely comprise electrical conductors depending on the buffering and interrupt functions constructed within the particular microcomputers 63, 67. As referred to above, a conventional Zilog Z80 SIO chip may be utilized to interface the microcomputers where a serial communication link is desired.

Figure 6:
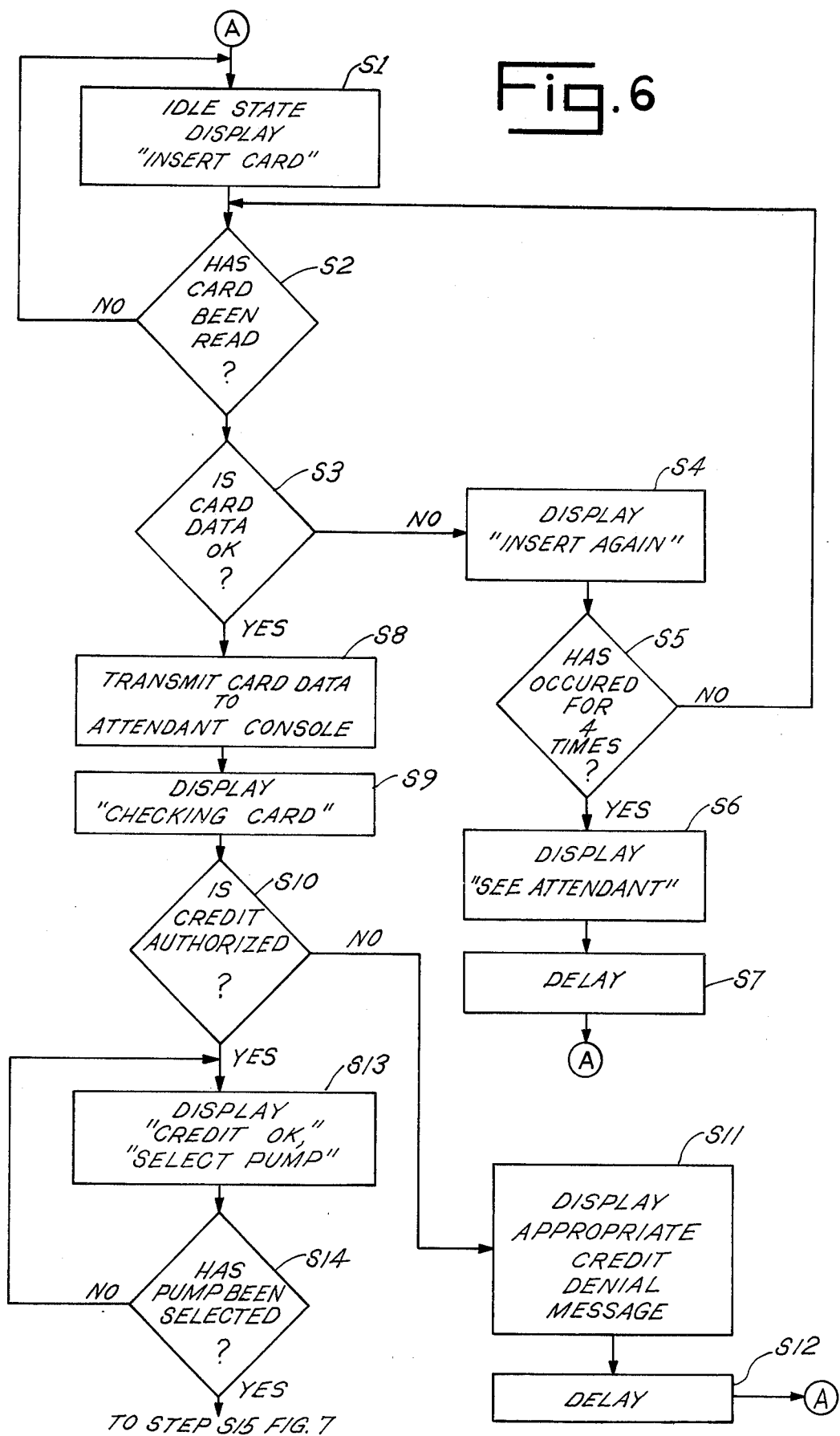
FIGS. 6 and 7 are flow charts illustrating the basic control sequence executed by the circuitry of FIG. 5.
Figure 7:
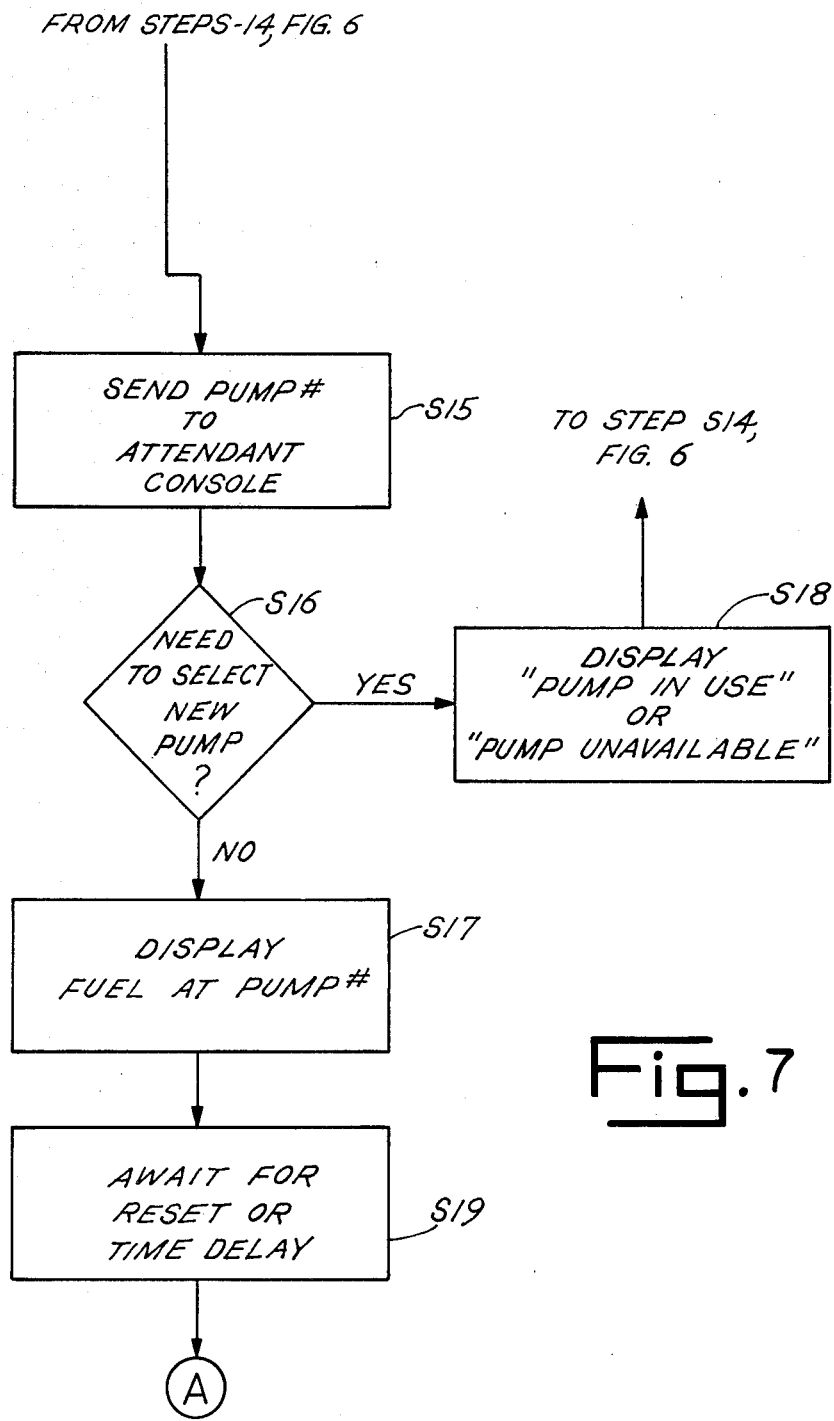

In order to provide a pump enablement request to the attendant by a customer using the customer console, microcomputers 63, 67 step through a control sequence of steps diagrammatically shown in the flow charts of FIGS. 6 and 7. The control sequence for the customer console embodies a set of subroutines utilized to transmit and read information from attendant console 21, read information from card reader 37 and from keyboard 39 and transmit information to display device 41.

Referring to FIG. 6, the encircled A indicates the initial entry point into the control sequence for execution of a pump enablement request from console 23 to console 21. At step S-1, microcomputer 67 transmits display signals to display device 41 to display "Insert Card". This display is maintained by microcomputer 67 until actuation of the console by a customer. This is the idle state of customer console 23. The customer console 23 is placed in its idle state by a "reset" instruction from attendant control console 21, as described below.

At step S-2, microcomputer 67 determines whether a credit card has been pulled through the customer console 23 in order to begin the process of pump enablement. So long as a credit card has not been read, customer control console 23 stays in its idle state. Upon the actuation of credit card reader 37, microcomputer 67 is signalled for retrieving the entire card data to be received. This may be accomplished by an interrupt signal from card reader 37.

Microcomputer 67 may perform a number of checks at step S-3 to determine whether the entire card data has been retrieved, similar to the card check performed by microcomputer 63 as discussed in U.S. Pat. No. 4,199,100. If card information is incomplete, microcomputer 67 may display a "INSERT AGAIN" (at step S-4) on display device 41 for signalling the customer to re-enter the credit card through card reader 37. If this occurs after four times in a row, microcomputer 67 may display "SEE ATTENDANT" on display device 41 to instruct the customer to see the attendant regarding the non-reading of the credit card, steps S-5, S-6, and S-7. As will suggest itself, either microcomputer 63, 67 may perform the step of checking the card data. Other checks may be performed at step S-3, as discussed above, for invalid or expired cards.

Where microcomputer 67 receives the entire card data, microcomputer 67 manipulates the data for transmission to console 21 (step S-8) and then actuates display device 41 at step S-9 for displaying "CHECKING CARD" to the customer. After the data has been received by microcomputer 63 of console 21, microcomputer 63 enters its subroutine for transmission of the credit card data to the data bank, as described in the U.S. Pat. No. 4,199,100. After data transmission, microcomputer 63 awaits credit authorization or denial to be returned from the data bank.

The data bank is stored with credit card validation data from which the validity of accounts can be determined. By way of example, if the data bank is a centralized data bank serving a plurality of service stations 11 from a remote location, then the data bank may store each account number together with an indication of whether the account is valid or invalid. The data bank functions by returning to the microcomputer a credit card validation data indicative of the credit card validity state.

As described in the U.S. Pat. No. 4,199,100, attendant control console 21 reads the data transmitted from the data bank and determines whether or not credit has been authorized. Depending on whether or not credit has been authorized, a particular display is to be shown on display device 42 to the customer. If credit is authorized, the display will read "CREDIT OK", "SELECT PUMP". Microcomputer 63 provides instructions to microcomputer 67 for displaying the proper information to the customer. Microcomputer 63 stores the credit card information.

At step S-10, microcomputer 67 responds to instructions from microcomputer 63 as to whether credit has been authorized. If credit has not been authorized, a message "SEE ATTENDANT" is displayed on display device 41 (steps S-11, S-12) for a predetermined time. Thereafter, microcomputer 67 returns to step S-1 and enters its idle state for use by a new customer.

If at step S-10 credit has been authorized, microcomputer 67 displays "CREDIT OK", "SELECT PUMP" and awaits the selection of the pump number by the customer, steps S-13a, S-13b, S-14. Microcomputer 67 then determines which of the several keys of keyboard 39 have been actuated and then forwards the information to microcomputer 63 at step S-15 (FIG. 7).

Microcomputer 63 upon receiving the pump request number searches its memory to determine whether or not the pump is available for actuation. If the pump is available for enablement, microcomputer 63 sends instructions to microcomputer 67 which are interpreted at step S-16 for actuation of display device 41 to display "FUEL AT PUMP NO. X", step S-17. Microcomputer 63 also actuates a flashing of the appropriate button 55 on display area 35 for signalling the attendant as to the particular pump being selected by the customer. The attendant then actuates the flashing button 55 directing microcomputer 63 to enable the selected gas pump.

If microcomputer 63 determines that the pump is unavailable or in use, instructions are sent to microcomputer 67 (steps S-16, S-18) directing display of "PUMP UNAVAILABLE" or "PUMP IN USE". As will suggest itself, step S-16 may limit the number of attempts at pump selection to no more than three.

Where the customer is required to select a new pump number at step S-18, microcomputer 67 transfers control back to step S-14. However, where a selected pump is available (step S-17), microcomputer 67 executes step S-19 in which the microcomputer waits for "reset" instructions from the attendant console in order to place the console in its idle state.

The microcomputer 63 monitors the rotating handle on the gas pump which has been selected in order to provide "reset" instructions to island console 23. If a predetermined time lapses without rotation of the handle of the selected pump microcomputer 67 resets console 23. In the case where a much larger delay occurs, microcomputer 63 erases any credit card information or the like stored in its microcomputer memory bank. Upon receiving reset instructions at step S-19 or upon lapse of time, microcomputer 67 returns to step S-1 placing the console in its idle state to await the next customer at island console 23.

It should be understood, of course, that the foregoing disclosure relates to preferred embodiments of the invention and that other modifications or alterations may be made therein without departing from the spirit or scope of the invention as set forth in the appended claims.

What is claimed is:

1. A system for use in a gasoline station, or the like, for automatic enablement of fuel dispensing means from the fuel island by a customer credit card, comprising:

a plurality of fuel dispensing means for dispensement of fuel, said plurality grouped to form at least one fuel island of the gas station, each said fuel dispensing means for generating first coded data signals representative of the fuel dispensed;

customer control means located at a fuel island, including:
  i. credit card reader means operable for reading indicia carried by a credit card and for generating card coded data indicative of said indicia;
  ii. customer-operable keyboard means including key means for operator generation of keyboard data indicative of a selected one of said fuel dispensing means;
  iii. display means responsive to display signals for visually displaying information for communicating with the customer;
  iv. output channel means for transmitting and receiving control data signals away from and to said customer control means; and
  v. first processor control means connected to said credit card reader means, said keyboard means, said display means and said output channel means, said processor control means being responsive to operation of said card reader means for transmitting control data signals carrying signals representing said card coded data via said output channel means and responsive to operation of said keyboard means for transmitting control data signals carrying signals representing said keyboard data via said output channel means and responsive to control data signals received via said output channel means for displaying visual information on said display means for instructing the customer's operation of said customer control means; and attendant control means for use by the attendant of the gas station, said attendant control means being manually operable by the attendant for enabling a selected one of said fuel dispensing means, said attendant control means including:
  i. data transmission means connectable to a data bank and capable of transmitting control data signals thereto and capable of receiving second coded data signals from the data bank representative of credit authorization, said second coded data signals having a valid credit state or a nonvalid credit state;
  ii. input channel means connected to said output channel means of said customer control means, for transmitting and receiving said control data signals from and to said customer control means;
  iii. indicator means for indicating to the attendant the value of dispensed fuel of one of said dispensing means; and
  iv. second processor control means connected to said fuel dispensing means, said data transmission means, said input channel means and said fuel indicator means, said processor control means responsive to certain of said control data signals received from said customer control means, for instructing said data transmission means to transmit credit card coded data to said data bank and responsive to said second coded data signals from the data bank for transmitting control data signals to said customer control means via said input channel means and responsive to certain of said control data signals from said customer control means for instructing enablement of a selected one of said fuel dispensing means and responsive to said first coded data signals for activating said indicator means, for providing an indication to the attendant of the value of dispensed fuel.

2. A system according to claim 1 wherein said fuel dispensing means includes signal generation means for generating control data signals for indicating that a fuel dispensing means has been actuated by the customer for operation, said signal generation means being connected to said input channel means; and wherein said second processor control means is responsive to said control data signals from said signal generation means for transmitting control data signals instructing idlement, to said customer control means via said input channel means; and wherein said first processor control means is responsive to said control data signals instructing idlement for causing said display means to display instructions for use of said customer control means by the next customer.

3. A system according to claim 2 wherein said signal generation means generates said control data signals upon the actuation of a mechanical switch of said dispensing means.

4. A system according to claim 1 wherein said second processor control means instructs enablement of a selected one of said fuel dispensing means by instructing the attendant for manual enablement of said selected one of said fuel dispensing means.

5. A system according to claim 1 wherein said attendant control means includes individual pump selection buttons manually actuable by the attendant; and communication means responsive to said second processor control means for communication with said attendant; and wherein said second processor control means is responsive to said keyboard data for actuation of said communication means for communicating with the attendant a particular pump number selected by the customer at said customer control means, said second processor control means being responsive to actuation of said pump selection buttons for instructing enablement of a selected one of said fuel dispensing means.

6. A system according to claim 2 wherein said attendant control means includes a credit card reader operable for reading indicia carried by a credit card and for generating card coded data indicative of said indicia.

7. A system according to claim 1 wherein said attendant control means includes visual display means responsive to display signals for visually displaying information for communicating with the attendant; and wherein said second processor control means is responsive to said second coded data signals for actuating said attendant control means that credit is unavailable.

* * * * *